United States Patent Office 3,172,747
Patented Mar. 9, 1965

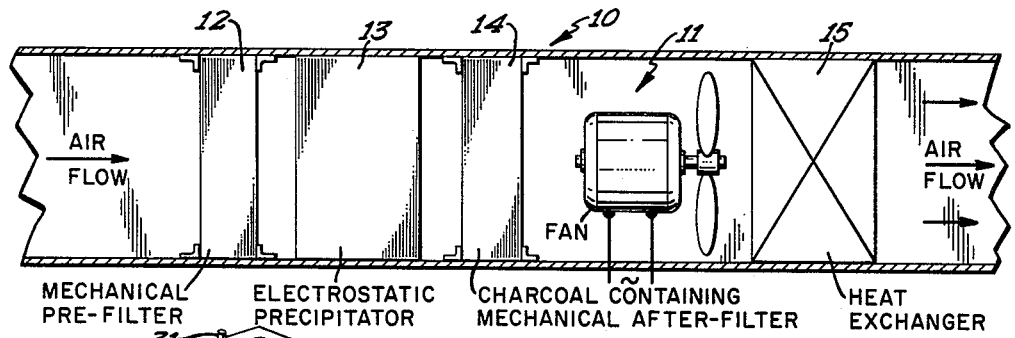
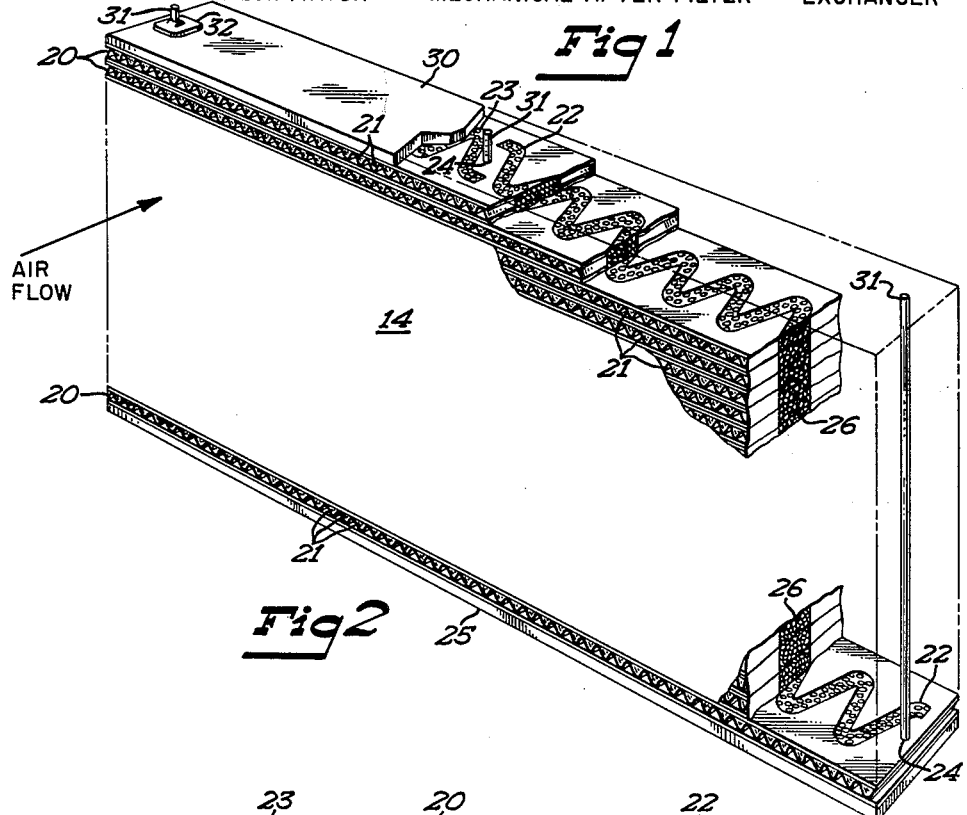
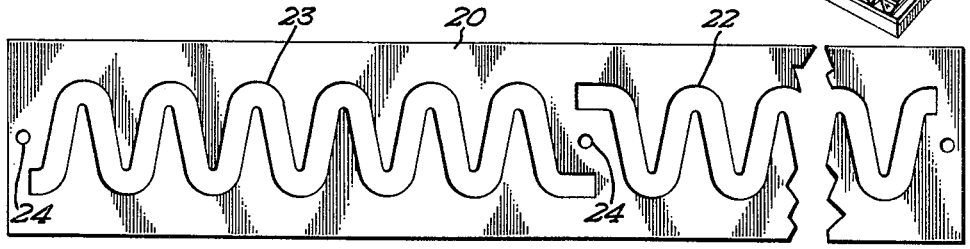

3,172,747
FLUID TREATING APPARATUS
Keith M. Nodolf, Bloomington, Minn., assignor to Honeywell Inc., a corporation of Delaware
Filed Dec. 10, 1962, Ser. No. 243,419
6 Claims. (Cl. 55—387)

This invention relates to fluid treating apparatus and more particularly to mechanical gas filters. Specifically it is directed to a mechanical gas filter of the type containing activated charcoal or similar gas treating material.

In many gas treating systems, it has been found desirable to add some means for removing odors from the gas. In forced air heating and/or cooling systems in many residences or business establishments, a mechanical filter of the lint screen or similar type is used to remove dust and other foreign particles from the air. Often this type of mechanical filter is used in conjunction with an electrostatic precipitator which is effective to remove smaller particles. However neither this mechanical filter nor the electrostatic precipitator is completely satisfactory for removing odors from the air. Therefore many systems now use an added filter containing activated charcoal or similar fluid treating material which is effective to remove odors from the gas.

These charcoal filters are of two main types. The first is the type wherein the filter has a plurality of air passages extending substantially parallel to the direction of air flow and the inner walls of each of these passages is coated with a material containing charcoal. This type of filter is in wide use today but has been found to be relatively ineffective where the odor level is high, probably due to the fact that a large amount of the air passing through the filter never actually comes in contact with the charcoal. Another type of charcoal filter which is in wide use today is the type wherein a bed of charcoal is placed in the air stream and the air is caused to flow directly through it. Generally the bed of charcoal is retained in an enclosure made from metal or similar material and having a large number of small perforations therein to allow the air to flow through it but to prevent the charcoal from passing out of it. This type of filter is much more effective than that previously described but has been found to be quite expensive and therefore in many cases, when the charcoal has been used for a long time and its efficiency becomes impaired, the filter has been removed and returned to the manufacturer so that the charcoal can be reactivated. This again is quite costly.

Therefore it has become apparent that there is a need for a charcoal filter which is sufficiently inexpensive so that it can be discarded and replaced with a new filter when its effectiveness becomes impaired by prolonged use but which will be very efficient in removing odors from the air during its period of use.

The present invention provides an improved mechanical gas filter of the type which contains a gas treating material such as activated charcoal and a method of making such gas filter. The filter is constructed of a plurality of strips of sheet material which are stacked one on top of another and closely spaced to permit gas flow between the strips. Each of the strips has one or more elongated openings formed therein and when the strips are stacked these elongated openings are aligned to form an opening into which the fluid treating material is placed. There is provided means for spacing the strips and for retaining the fluid treating material in the elongated openings. A cover strip is placed at the bottom and the top of the stack and these cover strips and the strips having the openings formed therein are fastened together in stacked relationship by appropriate means such as rods which extend upward through the stack and have fasteners at each end. The filter is adapted to be placed across a gas flow duct so that the gas passes between the sheets and through the treating material.

In the preferred embodiment of my invention the filter is constructed of corrugated cardboard cut into strips with the flutes extending in the direction of gas flow. In this embodiment the corrugated material between parallel sheets serves to space the sheets and also to retain the treating material in the elongated opening. The elongated opening comprises two zig-zag openings, each extending about halfway across the filter, the zig-zag configuration being used to increase the amount of treating material which is contacted by the gas.

Therefore an object of my invention is to provide a simplified mechanical gas filter of the type containing activated charcoal or similar fluid treating material.

Another object of my invention is to provide an improved mechanical gas filter of the type wherein the gas is passed through a bed of activated charcoal or similar fluid treating material.

Still another object of my invention is to provide a mechanical gas filter as described above which, while being sturdy and efficient, is sufficiently inexpensive so that it may be disposed of and replaced by a similar filter when its efficiency becomes impaired by prolonged use.

These and other objects of the invention will become apparent upon reading the following detailed description of the preferred embodiment of the invention in conjunction with the accompanying drawing wherein:

FIGURE 1 is a schematic showing of a portion of a typical residential air treating system in which the filter of the present invention may find application.

FIGURE 2 is a perspective view of the mechanical gas filter with portions broken away to better show the invention.

FIGURE 3 is a top view of one of the punched strips of which the filter is constructed.

In the following description, reference is made to the filter as being used in connection with air flow systems. It is to be understood that while this is the principal application of the filter, it may be equally applicable for filtering other gases.

Referring to FIGURE 1, the reference numeral 10 generally designates the air treating portion of a forced air heating or cooling system of the type which is often used in residential or commercial buildings. As seen in the figure, air passes from left to right through the system, the air entering the left end of the air treating portion from a series of air return ducts (not shown). Similarly the air leaving the right end of the air treating portion of the system is supplied to a series of air supply ducts (not shown) extending through the building. The air is moved through the system by a fan or blower 11 which may be of any conventional type. As air enters the treating portion of the system, it first passes through a mechanical prefilter 12 which also may be of any conventional design, for instance, it may be of the general type shown in the Frank L. Meyers Patent Number 2,138,874, issued December 6, 1938. After passing through the mechanical prefilter, the air then passes through an electrostatic precipitator 13 also of any typical construction, for instance as shown in Patent Number 3,028,715 issued to me April 10, 1962, and assigned to the assignee of the present invention. After passing through the electrostatic precipitator, the air then passes through a charcoal containing mechanical after filter 14 which is the subject of the present invention and will be described in more detail in connection with FIGURE 2. The air next passes over the fan and then through a heat exchanger 15 which may be effective to either heat or cool the air as desired. In addition to the air treating components shown in FIGURE 1, it will also be obvious that equipment might be added for humidifying or de-humidifying the air as required by the particular installation.

Referring now to FIGURE 2, the mechanical gas filter 14 will be described in detail. The filter 14 is made up of a plurality of relatively long, narrow strips 20 of corrugated cardboard which may be either of the double faced or single faced type. Each of the strips 20 is cut from a large sheet of cardboad so that the corrugations or flutes therein, indicated at 21, extend in a direction parallel to the short dimensions of the strip. Each of the strips is then punched to form two elongated zig-zag openings 22 and 23 therethrough, as seen more clearly in FIGURE 3. These openings begin just slightly inward from the ends of the strips and extend from either end to approximately the center of the strip. Each of the strips is also punched with three small circular openings 24, one being located just inward from each end of the strip and one at approximately the center thereof.

The strips of cardboard are then stacked one on top of another so that the elongated zig-zag openings 22 and 23 therein are aligned and collectively form two composite channels extending from top to bottom of the filter and substantially in a direction transverse to the direction of the corrugations or flutes 21. A cover strip 25 is placed adjacent the lowermost of the corrugated strips and is effective to close the lower ends of the openings 22 and 23. The cover strip 25 may be of cardboard similar to that used in the strips 20, but preferably is of fiber board or metal to add rigidity to the filter. The openings 22 and 23 extending through the filter are then filled with a gas treating material 26 such as pelletized activated charcoal. A cover strip 30 which may be identical to lower cover strip 25, previously described herein, is placed adjacent the upper sheet of cardboard and is effective to close the upper end of the openings 22 and 23. The strips of corrugated cardboard 20 and the cover strips 25 and 30 may be retained in tightly stacked relationship by passing rods 31 through the openings 24 and then fastening the rods at either end. This may be accomplished by appropriate means such as Tinnerman fasteners 32.

While the opening into which the bed of activated charcoal is placed has been described as actually being the two elongated zig-zag openings 22 and 23, it will be obvious that a single opening extending substantially all the way across the filter could be used. The zig-zag opening has been used to afford a greater effective area of charcoal in the filter. Also, various methods of retaining the strips 20 and the cover strips 25 and 30 in stacked relationship may be used, the rods or pins 31 simply having been found to be the most economical for a particular application. Also, while reference is made to activated charcoal which is widely used for odor removal, this filter might also be used for retaining other gas treating material such as might be desirable for particular applications.

As will be obvious, the filter is mounted across the air flow stream with the corrugations or flutes 21 extending substantially parallel to the direction of air flow. Thus these flutes or corrugations provide air passages through the filter and air passes therethrough until it reaches the channels or openings 22 and 23. At this point the air must pass through the bed of activated charcoal 26 until it again reaches the flutes in the cardboard at which time it passes on to the back side of the filter. Thus the entire air flow through the system is exposed to the bed of activated charcoal which is effective to remove odors and certain gases therefrom.

From the above description, it will be seen that the materials used in the charcoal filter are extremely inexpensive. In addition, the construction of the filter is also simple and therefore the cost of production is reduced. The simple construction renders the filter readily adaptable to automatic manufacture. In actual manufacture of the filter, large sheets of cardboard are cut into these strips 20. These are then passed through a machine which punches the openings 22 and 23 and the small apertures 24 in the sheets. The pins or rods 31 are bent over at the lower end and are then passed through the bottom cover strip 25, the bent over end retaining the cover strip in connection with the pin. Thereafter the strips 20 are slid down over the pins with the pins extending through the small apertures 24 and thus the strips are stacked one on top of another and the openings 22 and 23 in each of the individual sheets co-act to form openings extending from top to bottom of the stacks of strips. The activated charcoal 26 is then poured into the openings until the openings are substantially filled. The top or upper cover strip 30 is then placed over the pins 31 and pressed tightly against the uppermost of strips 20. The Tinnerman fasteners 32 are then pushed down over the upper end of the pins 31 to maintain the cover strips and the punched strips in tightly stacked relationship.

Due to the simplicity of construction, the ease of manufacture and the extreme low cost of the materials used in fabricating this filter, the total cost to the ultimate consumer for this type of filter is very low relative to other types of charcoal filters of equal performance. Therefore, when the usefulness of the filter becomes impaired due to prolonged use, it can merely be discarded and replaced by a similar filter. Thus it is not necessary to take out the filter and either replace the charcoal or return the entire filter to the manufacturer for reactivation as was commonly done in the past. In addition, the filter itself is light in weight and very easy for the home owner or maintenance person to handle when it is necessary to replace the filter.

While a single illustrative embodiment of my invention has been shown and described herein, it will be obvious that various modifications and changes will become apparent to those skilled in the art. Theerfore it is to be understood that my invention is to be limited solely by the scope of the appended claims.

I claim:

1. A mechanical gas filter adapted for mounting in a gas flow duct comprising: a plurality of sheets of corrugated cardboard each having an elongated opening formed therethrough extending transversely to said corrugations and intersecting said corrugations; said sheets being stacked one on top of the other so that the elongated openings therein are aligned and collectively form a composite elongated opening through said filter transverse to said corrugations so that said corrugations provide gas flow passages through said filter into and out of said elongated opening; means retaining said sheets in stacked relationship; gas treating material substantially filling said elongated opening; and means closing opposite ends of said elongated opening to retain said gas treating material therein.

2. Mechanical gas filter apparatus comprising: a plurality of sheets of corrugated material, each of said sheets having at least one elongated opening formed therethrough and extending transversely to said corrugations, said sheets being stacked one on top of the other so that the elongated openings therein are aligned and collectively provide a composite opening through said filter transverse to said corrugations, the filter being adapted to be mounted across a gas flow passage so that said composite opening extends substantially across the gas flow passage and the corrugations extend in the direction of gas flow and provide gas flow passages through the filter into and out of said composite opening; means for retaining said sheets in stacked relationship; means blocking the ends of said elongated opening; and gas treating material substantially filling said elongated opening.

3. Mechanical gas filter apparatus comprising: a plurality of fluted cardboard strips stacked one on top of the other and adapted to be mounted across a gas flow passage, the flutes in said strips extending in the direction of gas flow and providing flow passages through the filter, each of said strips having at least one opening formed therethrough transversely to said flutes and intersecting said flutes, the elongated openings of said strips being aligned when said strips are stacked one on top of the other and thereby collectively providing a composite opening through said filter transverse to said flutes and extending from top to bottom of said filter; first and second cover strips stacked adjacent the first and last of said strips respectively and closing opposite ends of said composite opening; means for retaining said strips and said cover strips in stacked relationship; and gas treating material substantially filling said composite opening.

4. The mechanical gas filter apparatus of claim 3 wherein the gas treating material in said composite opening contains activated charcoal.

5. The mechanical gas filter apparatus of claim 4 wherein said opening in said strips is in the form of a zig-zag to provide added surface contact between the gas treating material and the gas being filtered.

6. In a mechanical gas filter adapted to be mounted in a gas flow duct, the combination comprising: a plurality of strips of sheet material each having at least one elongated opening formed therethrough and extending along the length of the strip; said strips being stacked one on top of the other so that the elongated openings therein are aligned and collectively form an elongated opening through said filter and extending transversely to the direction of gas flow through a duct when the filter is mounted therein; gas treating material substantially filling said elongated opening; means intermediate adjacent ones of said strips, said last named means maintaining said strips in sufficiently spaced relationship to allow gas flow therebetween and acting to prevent the egress of said gas treating material through the spaces between said strips; means covering the ends of said elongated opening; and means for retaining said strips in stacked relationship.

References Cited by the Examiner
UNITED STATES PATENTS

| | | | |
|---|---|---|---|
| 2,055,774 | 9/36 | Ray | 55—387 |
| 2,628,083 | 2/53 | Rnese | 55—279 X |
| 2,945,554 | 7/60 | Berly | 55—378 X |
| 2,973,828 | 3/61 | Engle | 55—278 |
| 3,075,335 | 1/63 | Bandlow | 55—385 |

REUBEN FRIEDMAN, *Primary Examiner.*

HARRY B. THORNTON, *Examiner.*